June 21, 1960 W. J. SCHART ET AL 2,941,721

COMPUTING APPARATUS

Filed Feb. 18, 1955 2 Sheets-Sheet 1

INVENTORS:
William J. Schart &
BY Burton W. Bostad
Walter J. Jason
ATTORNEY

FIG. 2a
| INPUTS | | | OUT-PUT |
|---|---|---|---|
| 72 | 73 | 74 | 75 |
| 0 | 0 | 0 | 0 |
| 0 | 1 | 0 | 0 |
| 0 | 0 | 1 | 0 |
| 0 | 1 | 1 | 1 |
| 1 | 1 | 0 | 1 |
| 1 | 0 | 1 | 1 |
| 1 | 1 | 1 | 1 |
| 1 | 0 | 0 | 0 |
FIG. 2
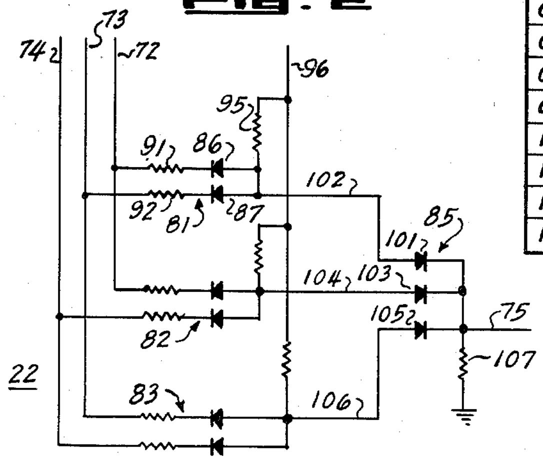
FIG. 2b
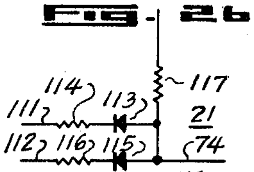
FIG. 6
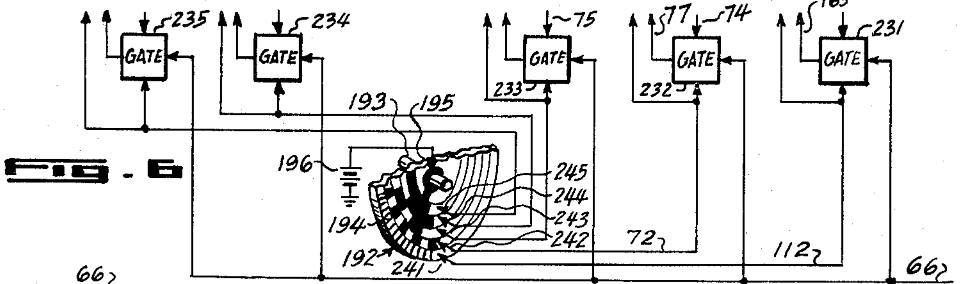
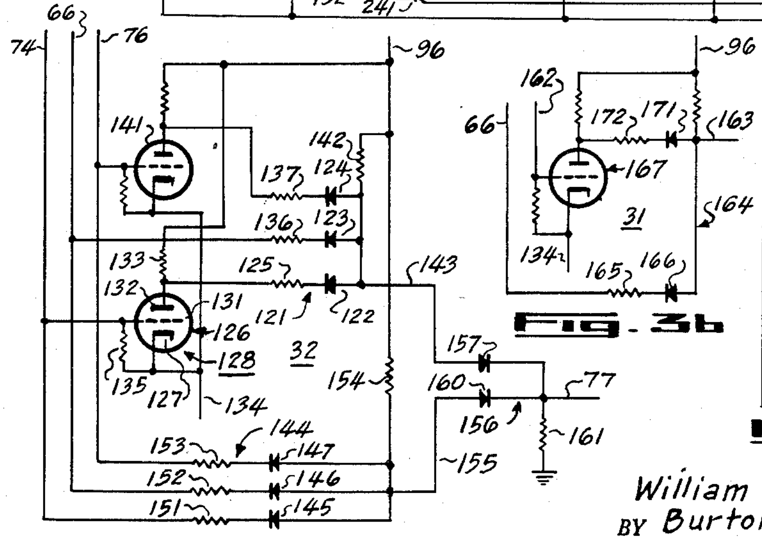
FIG. 3b
| INPUTS | | | OUT-PUT |
|---|---|---|---|
| 74 | 66 | 76 | 77 |
| 0 | 0 | 0 | 0 |
| 0 | 1 | 0 | 1 |
| 0 | 0 | 1 | 0 |
| 0 | 1 | 1 | 0 |
| 1 | 1 | 0 | 0 |
| 1 | 0 | 1 | 0 |
| 1 | 1 | 1 | 1 |
| 1 | 0 | 0 | 0 |
FIG. 3a
FIG. 3
INVENTORS:
William J. Schart &
BY Burton W. Bostad
Walter J. Jason
ATTORNEY

United States Patent Office 2,941,721

Patented June 21, 1960

2,941,721

COMPUTING APPARATUS

William J. Schart, La Mesa, and Burton W. Bostad, Chula Vista, Calif., assignors to General Dynamics Corporation, San Diego, Calif., a corporation of Delaware Filed Feb. 18, 1955, Ser. No. 489,256

6 Claims. (Cl. 235—175)

This invention relates to electrical calculating devices, and more particularly to an electrical circuit for parallel addition of binary numbers.

Electrical circuits having two registers for the parallel addition of binary numbers heretofore known to the art have operated in a manner analogous to the addition operation as performed by manually adding two conventionally written binary numbers. Thus, conventional addition of two binary numbers is performed in an order-by-order manner as illustrated below:

| | | | | | | | | | | | | |
|---|---|---|---|---|---|---|---|---|---|---|---|---|
| | 11 | 10 | 9 | 8 | 7 | 6 | 5 | 4 | 3 | 2 | 1 | Order |
| | 1 | 0 | 1 | 1 | 0 | 0 | 1 | 0 | 1 | 1 | 0 | Augend |
| | 1 | 1 | 0 | 1 | 1 | 0 | 1 | 1 | 0 | 1 | 1 | Addend |
| 1 | 1 | 1 | 1 | 0 | 0 | 1 | 1 | 1 | 1 | 0 | | Carry |
| 1 | 1 | 0 | 0 | 0 | 1 | 1 | 1 | 0 | 0 | 0 | 1 | Sum |

It will be apparent that, as the digits of the lowest binary order are added, the presence or absence of a carry digit must be noted. The binary digits of the second order are then added, along with the carry digit from the first order, if present, and the presence or absence of a carry digit from the second order is noted. In general, the *n*th order digits are added, together with a carry digit generated by the addition of the $n-1$ order digits. The carry digit generated by the addition of the *n*th order digits and the carry digit from the $n-1$ order then added along with the $n+1$ order digits. It will be apparent, therefore, that in conventional binary addition, and similarly in many of the heretofore known parallel adders operating in an analogous manner, each binary order must be added in succession in order to determine the presence or absence of an addition carry digit for in the following binary order. Electronic parallel binary adders having two registers operating in accordance with the hereinabove described mode of addition are seriously limited in speed of addition by the serial mode of propagating carry digits from order to order. The digits of the *n*th order cannot be added until the digits of the $n-1$st order have previously been added, and the presence or absence of a carry to the *n*th order has been thereby determined. Thus, it will be apparent that addition in the *n*th order must await completion of addition in the $n-1$st order, and addition in the $n+1$st order must await completion of addition in the *n*th order. The total addition time for adding two binary numbers thus depends upon the number of binary orders, and the time required for each order to assume its final condition. In a large-scale electronic computer, the time required for the trigger circuits to change condition consecutively during the addition process will frequently make the addition process lengthy, thereby lengthening the operating cycle to an undesirable extent.

Parallel binary adders wherein carry digits generated by the sum of one order are propagated to higher orders through gates are known to the art. However, such circuits heretofore known have required three separate registers, one containing the addend, a second containing the augend, and a third register to receive the sum. As will immediately be apparent, such circuits increase the number of trigger circuits required in the adding unit by 50 percent. The additional complexity, size and power consumption resulting from the requirement for three separate registers will frequently overbalance the resultant increased speed of computation.

The addition operation as performed by this invention requires neither order-by-order propagation of carries, nor individual registers for the addend, augend and sum. In contrast to prior parallel adders, an adder constructed in accordance with this invention requires only two registers and adds two binary numbers of any desired size in the time required for a single trigger circuit to change condition in response to a pulse. When adding two binary numbers, each having, by way of example, 30 digits, one type of parallel adder known heretofore must allow time for each one of the 30 trigger circuits to change state consecutively, or as mentioned hereinbefore, in the other type where simultaneous triggering is performed, 90 individual trigger circuits, are required. In contrast, the identical 30 digit numbers may be added in accordance with the principles of this invention in the time required for only one trigger circuit to change condition, since all triggers which change state do so simultaneously. Furthermore, only 60 trigger circuits are needed to add two 30 digit binary numbers. As the two binary numbers to be added are inserted respectively into the augend register and a combined addend and sum register, gate circuits in each order are simultaneously conditioned by the digits inserted. A command pulse is then simultaneously applied to gate circuits in each order, which are operatively associated with the gate circuits previously conditioned by the inserted digits, whereupon the conditioned gates cause the triggers in the combined addend and sum register to simultaneously change condition in those orders wherein such change is required to indicate the true sum of the binary numbers, which automatically includes consideration of all carry digits. Thus, it will be seen that where the principles of the present invention are utilized for summing two digital representations, carry digits are not propagated through each trigger circuit of increasing significance but are immediately inserted in their ultimate and proper position. Accordingly, the summation operation of two digital representations, having any desired number of digits, may be performed substantially instantaneously.

In another embodiment of this invention, the instantaneous magnitude of a variable, such as a voltage, current, temperature, etc. which may conveniently be represented by the angular rotation of a shaft, may be added to a binary number standing in an addend register without the necessity of augend trigger circuits. The shaft position is translated into a multi-order binary number by known means. Each binary digit representing said variable is furnished to the gate circuits of this invention in the form of the presence or absence of a voltage on each of a plurality of conductors, one conductor being provided for each order. Thus, each of said plurality of conductors functions in a manner similar to a trigger circuit of the augend register in the first embodiment.

While this invention is embodied herein in terms of circuits adapted for addition of two multi-order binary numbers, it will be apparent to one skilled in the art that such additional mathematical processes as subtraction, integration, multiplication and division may be accomplished by this invention merely by varying the form of the digits furnished, by reiterated application of the command pulse, or combinations thereof. The subtraction process may be accomplished merely by inserting ones complements into the augend register. Division is merely repeated subtraction, whereby the command pulse is repeatedly applied. Multiplication of two numbers similarly merely requires repeated application of the command pulse. Approximate integration of the number in one register may be carried out by programming the numbers of command pulses applied in such a manner as to be proportional to the variable with respect to which integration is to be carried out. It will be seen, therefore, that while this invention is most simply explained in terms of the addition process, other mathematical operations may be carried out by means of this invention.

Therefore, it is an object of this invention to provide an improved computing device enabling substantially instantaneous combination of a plurality of digits.

Another object of this invention is to provide a computing device enabling simultaneous operation upon a multi-order digital representation by an applied variable.

Still another object of this invention is to provide a computing device with gate circuits enabling substantially instantaneous transfer of digits into a register upon receipt of a command pulse.

A related object of this invention is to provide a computing device having a single register for receipt of digits and presenting a result.

Further, it is an object of this invention to provide a computing device enabling a first digital representation to be substantially simultaneously summed with a second digital representation.

Still another object of this invention is to provide a computing device wherein a first digital representation may be substantially simultaneously added to a second digital representation with automatic and simultaneous consideration of all carries.

A still further object of this invention is to provide a computing device wherein first and second multi-order digital representations condition a plurality of gate circuits in a manner enabling an applied pulse to add said first digital representation to said second digital representation substantially instantaneously, with simultaneous insertion of carries in said second digital representation.

Another object of the invention is to provide an improved computing device wherein binary numbers may be added by simultaneous operation on all ordinal places with provision for simultaneous addition of carry digits.

A further object of this invention is to provide improved computing circuits capable of producing carry indicating voltages in accordance with novel methods of binary addition.

It is a further object to provide an improved summing gate circuit requiring a minimum number of logical elements.

It is still another object of this invention to provide a computing device which is simple and inexpensive to construct, which is compact, and which may be advantageously utilized for mathematical operations, such as addition, subtraction, multiplication, division and integration. The elements need not be constructed with extreme precision, and the number of tubes and other parts is small as compared to prior computers of comparable speed.

Other objects and advantages of the invention will become apparent upon study of the specification and appended drawings, wherein:

Figure 2 is a schematic diagram of a typical gate circuit suitable for indicating carry digits;

Figure 2(*a*) illustrates the logical function table associated with the gate circuit of Figure 2;

Figure 2(*b*) is a schematic diagram of a simplified gate circuit of the form illustrated by Figure 2, suitable for use in the first order;

Figure 3 is a diagram schematically representing a typical gate circuit employed in this invention for changing the addend register to indicate the sum digit;

Figure 4:
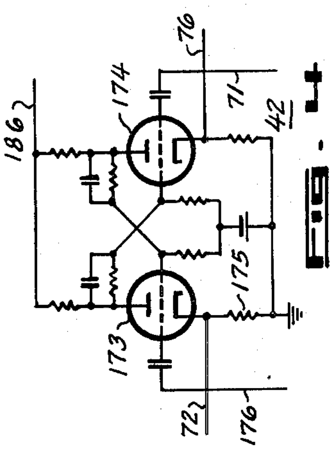

Figure 3(*a*) illustrated the logical function table associated with the gate circuit of Figure 3;

Figure 3(*b*) is a schematic diagram of a simplified gate circuit of the form illustrated by Figure 3, suitable for use in the first order;

Figure 4 is a schematic diagram representing a typical augend trigger circuit which may be used in connection with this invention.

Figure 5:
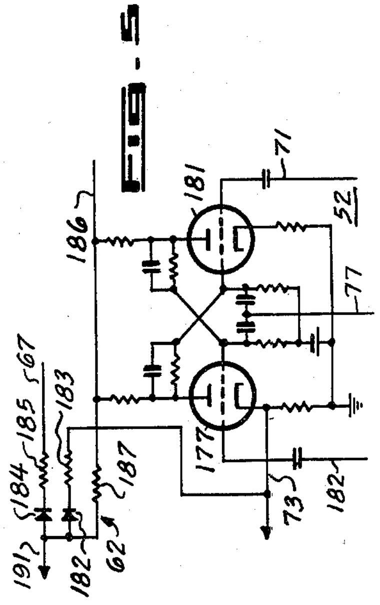

Figure 5 is a schematic diagram representing a typical addend and sum trigger circuit which may be used in carrying out this invention; and Figure 6 is a block diagram of a second form of computer constructed in accordance with the present invention suitable for cummulatively adding binary digits representing a condition.

The adder to be described employs the binary system of numbers, and it will be assumed that such system is sufficiently well known to any persons skilled in the computer art as not to require further discussion. Complete information on the binary system may be obtained from various mathematical texts. As is conventional, the two binary digits employed are referred to as 0 (zero) and 1 (one) in the discussion which follows.

Essentially, the process of adding two multi-order binary numbers consists of determining the digit in the sum in each order corresponding to the addend and augend digits of that order, in addition to a carry digit from a previous order, if present. The present invention exemplifies a unique manner of determining the desired sum digit. Starting from the addend and augend digits of the *n*th order, the pairs of addend and augend digits of successively lower orders, $n-1$, $n-2$, . . . $n-n$, are investigated seriatim, until an order is reached wherein the binary numerals consist of a pair of digits each having the same integer, that is, a (0, 0) pair or a (1, 1) pair. The (0, 0) pair does not generate a carry digit, while a (1, 1) pair of digits produces a carry digit which is added to a higher order. As will be apparent to one skilled in the art, each type of pair affects the addition of higher order digits differently. In the first case, the first pair of digits reached as successive lower orders are investigated is assumed to be a (0, 0) pair. In this case when higher order digits are added, the following four possibilities arise:

| | | | | |
|---|---|---|---|---|
| Addend digit | 0 | 0 | 1 | 1 |
| Augend digit | 0 | 1 | 0 | 1 |
| Sum digit | 0 | 1 | 1 | 0 |

In the second case, the first pair of digits of lower order arrived at is assumed to be a (1, 1) pair, thus generating a carry digit. Herein, when adding higher order digits, the following possibilities arise:

| | | | | |
|---|---|---|---|---|
| Addend digit | 0 | 0 | 1 | 1 |
| Augend digit | 0 | 1 | 0 | 1 |
| Sum digit | 1 | 0 | 0 | 1 |

It is well known to those familiar with the addition process in the binary system of numeration that a carry digit is created by the addition of a (1, 1) pair. The carry digit so created is propagated through successively higher orders until an order is reached wherein both the addend and augend digits are both zeros, comprising a (0, 0) pair, whereupon propagation of the carry digit ceases, or both digits are ones, comprising a (1, 1) pair, whereupon propagation of the old carry digit ceases, and a new carry digit is propagated. It will be apparent therefore, that lower order pairs are investigated to determine if a carry is present at any order.

By applying the foregoing tables and observations, a novel procedure for adding two multi-order binary numbers embodied by this invention may be illustrated. In accordance with this novel procedure, the *n*th place augend digit is compared with the first pair of like digits of lower order met with as the $n-1$, $n-2$, $n-3$, . . . orders are scanned. If the *n*th place augend digit is the same as the first lower order digit pair encountered, that is, a 1 augend digit and a (1, 1) pair, or a 0 augend digit and a (0, 0) pair, the *n*th place sum digit is the same as the *n*th place addend digit. That is, both are 1's or 0's. On the other hand, if the *n*th place augend digit and the first lower order pair are unlike, that is, a 1 augend digit and a (0, 0) pair or a 0 augend digit and a (1, 1) pair, the *n*th place sum digit is opposite from the *n*th place addend digit. Illustratively the addend digit is a 1 and the sum digit is a 0, or vice versa. To apply this procedure to multi-order numbers, an imaginary (0, 0) pair of digits is placed to the right of the binal point. In the example following hereinafter, such imaginary digits will be denoted by being enclosed with quotation marks, thus, "0."

A typical problem in binary addition will assist in understanding the novel mode of adding two binary numbers embodied by this invention.

Assume the following two eleven order binary numbers are to be added:

| 11 | 10 | 9 | 8 | 7 | 6 | 5 | 4 | 3 | 2 | 1 | | Order |
|---|---|---|---|---|---|---|---|---|---|---|---|---|
| 1 | 0 | 1 | 1 | 0 | 0 | 1 | 0 | 1 | 1 | 0 | "0" | Augend |
| 1 | 1 | 0 | 1 | 1 | 0 | 1 | 1 | 0 | 1 | 1 | "0" | Addend |

Starting with the lowest order digit, it will be seen that the augend digit is a 0, as are the digits of the next lower order pair ("0," "0"), to the right of the binal point. Since the augend digit and the pair are the same, the sum digit is a 1, as is the addend digit in this order.

| | |
|---|---|
| 1 | Order |
| 0."0" | Augend |
| 1."0" | Addend |
| 1 | Sum |

In the second order, the augend digit is a 1 while the next lower order pair comprise the imaginary ("0," "0") pair. Thus, the sum digit is a 0, the opposite of the 1 addend digit.

| | |
|---|---|
| 2 | Order |
| 1."0" | Augend |
| 1."0" | Addend |
| 0 | Sum |

Continuing to the third order, it will be noted that the next lower order pair is the (1, 1) pair in the second order. The augend digit is a 1, similar to the digits of the second order (1, 1) pair, and, therefore, the 0 sum digit in this order is the same as the 0 addend digit.

| | | |
|---|---|---|
| 3 | 2 | Order |
| 1 | 1 | Augend |
| 0 | 1 | Addend |
| 0 | | Sum |

The augend digit in the fourth order is a 0. The next lower order pair is the (1, 1) pair in the second order. Since the digits of the (1, 1) pair and the 0 augend digit are unlike, the 0 sum digit is the opposite of the 1 addend digit in this order.

| | | |
|---|---|---|
| 4 | 2 | Order |
| 0 | 1 | Augend |
| 1 | 1 | Addend |
| 0 | | Sum |

Similarly, in the fifth order,

| | | |
|---|---|---|
| 5 | 2 | Order |
| 1 | 1 | Augend |
| 1 | 1 | Addend |
| 1 | | Sum |

The sum digit in the sixth order is determined with reference to the (1, 1) digit pair of the fifth order, since this pair is now the next lower order pair. Thus,

| | | |
|---|---|---|
| 6 | 5 | Order |
| 0 | 1 | Augend |
| 0 | 1 | Addend |
| 1 | | Sum |

However, in the seventh order, the sum digit is determined by reference to a new pair, specifically, the (0, 0) pair of the sixth order.

| | | |
|---|---|---|
| 7 | 6 | Order |
| 0 | 0 | Augend |
| 1 | 0 | Addend |
| 1 | | Sum |

Again, the eighth order sum digit is determined with reference to the sixth order (0, 0) digit pair,

| | | |
|---|---|---|
| 8 | 6 | Order |
| 1 | 0 | Augend |
| 1 | 0 | Addend |
| 0 | | |

Continuing, the ninth order sum digit, determined by reference to the eighth order pair, is the same as the addend digit, a 0. The sum digit in the tenth order is a 0, since the eighth order (1, 1) pair and the 0 augend digit are opposite, the eleventh order sum digit is a 1, and the highest order sum digit is a 1. As will be obvious to one skilled in the art, the sum register will be large enough to contain all the sum digits.

Consolidating the above results of each order of this novel procedure for adding binary numbers, we have:

| | 11 | 10 | 9 | 8 | 7 | 6 | 5 | 4 | 3 | 2 | 1 | | Order |
|---|---|---|---|---|---|---|---|---|---|---|---|---|---|
| | 1 | 0 | 1 | 1 | 0 | 0 | 1 | 0 | 1 | 1 | 0. | "0" | Augend |
| | 1 | 1 | 0 | 1 | 1 | 0 | 1 | 1 | 0 | 1 | 1 | "0" | Addend |
| 1 | 1 | 0 | 0 | 0 | 1 | 1 | 1 | 0 | 0 | 0 | 1 | | Sum |

It will be noted that the sum arrived at in the novel manner disclosed hereinabove is identical to the sum arrived at previously by the conventional mode of addition of binary numbers.

Figure 1:
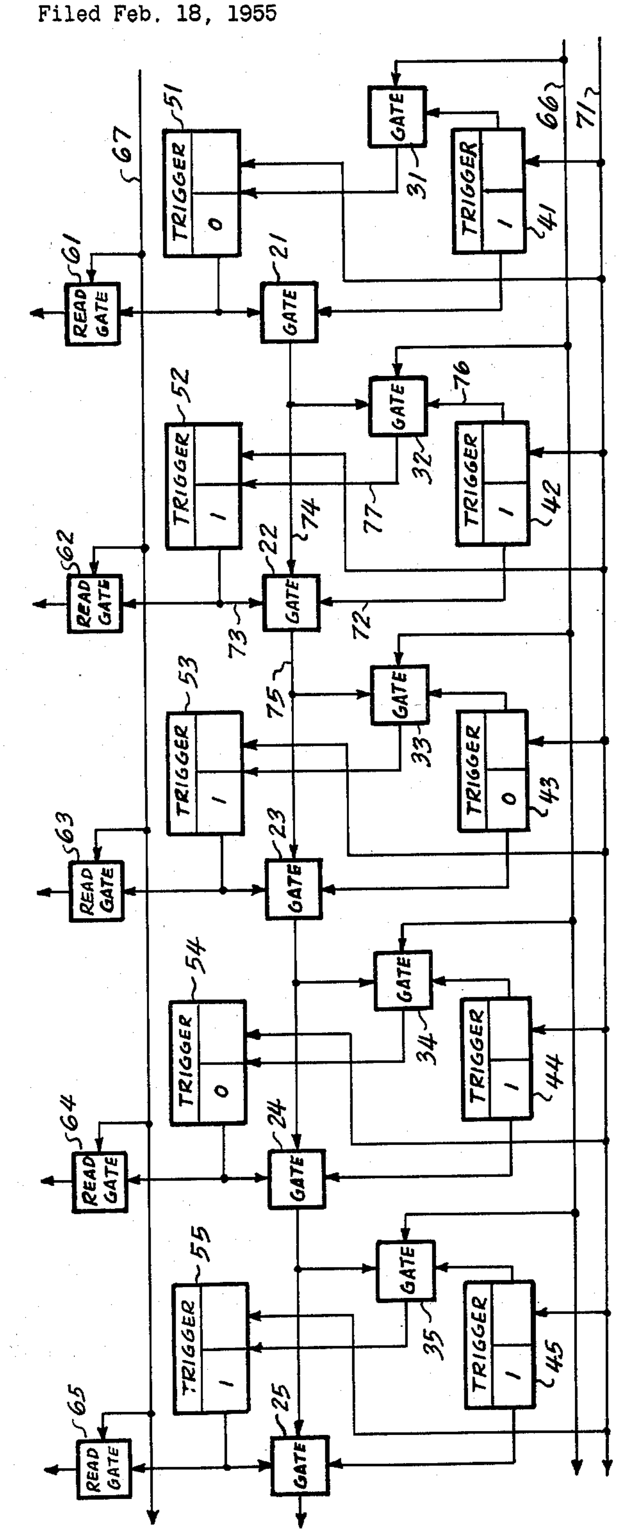
Figure 1 is a block diagram of one form of computer constructed in accordance with the present invention suitable for adding two numbers expressed in binary notation.

Referring now to the drawings, and particularly to Figure 1 thereof, a binary adder embodying this invention is illustrated therein. While the portion of the disclosed embodiment illustrated in Figure 1 encompasses only five orders, it will be apparent to one skilled in the art that this invention is not limited thereto, but may be expanded to include as many orders as desired.

The five digit augend register illustrated in Figure 1 comprises trigger circuits 41, 42, 43, 44 and 45. Trigger circuits 51, 52, 53, 54 and 55 form a combined addend and sum register. A first group of gate circuits 21, 22, 23, 24 and 25, serve to indicate to higher orders the presence and values of digit pairs present in lower orders. A second group of gate circuits, 31, 32, 33, 34 and 35, are furnished to change the addend digit in response to an "add" command pulse if such a change is required by a lower order pair. The "add" command pulse is provided to each of gates 31–35 simultaneously by means of bus 66. Upon completion of the addition operation, the digits standing in registers 51–55, representing the sum, are read out simultaneously to the desired utilization apparatus through gate circuits 61, 62, 63, 64 and 65 in response to a "read" command pulse on readout bus 67. The registers may then be reset by applying a suitable "reset" command pulse on reset bus 71 in preparation for a subsequent addition operation.

Gate 22, representative of gates 21–25, is connected to augend trigger 42 by means of lead 72. A conductor 73 connects gate 22 to addend and sum trigger 52. Conductor 74 furnishes the output of gate 21 of the first order to gates 22 and 32 in the second order. Similarly, output lead 75 supplies the output signal from gate 22 in the second order to gates 23 and 33 in the third order. Gate 32, in addition to input lead 74, is furnished with an input signal representing the complement of the digit standing in trigger 42 over lead 76, in addition to the add pulse from bus 66. The output from gate 32, serving to change the condition of trigger 52, is supplied to trigger 52 over conductor 77.

Gate 22, representative of gates 22, 23, 24 and 25, is illustrated in Figure 2. Gate 22 comprises three logical "and" circuits 81, 82 and 83, in addition to an "or" circuit 85. Logical "and" circuit 81, typical of circuits 81, 82 and 83 includes two diode rectifiers, 86, and 87. A resistor 91 is connected between input lead 72 and diode 86, while resistor 92 is connected between input lead 73 and diode 87. Diodes 86 and 87 are connected through a common output lead 102 to "or" circuit 85. A source of positive potential, not shown, is connected to rectifiers 86 and 87, by means of resistor 95 and power bus 96. The circuits of "and" gates 82, and 83 are substantially similar to "and" gate 81, and will not be described in detail.

"Or" gate 85 includes a diode 101 connected through lead 102 to "and" gate 81, diode 103 connected to "and" gate 82 through conductor 104, and diode 105 connected through lead 106 to "and" gate 83. Diodes 101, 103 and 105 are connected to a common output lead 75. A load resistor 107 is connected between output lead 75 and ground.

As will be apparent from Figures 1 and 2, each of gates 22–25 has three input terminals and one output terminal. Gates 22–25 serve to indicate to higher orders the presence and values of digit pairs present in lower orders, thus determining the effects of carries from previous orders on subsequent orders. In the quiescent state, with no inputs and no output, zero potentials are present on all three input leads and on the output lead. Exemplarily, in gate 22, this situation obtains when a 0 is standing in augend register 42, in addend and sum register 52, and, in addition a carry signal is not present at input lead 74 from previous order gate 21. Input signals, consisting of a positive pulse on the selected input leads, exemplarily, 90 volts, are applied to input lead 72 by a 1 standing in addend register 42, and to input lead 73 by a 1 standing in augend register 52, and to input lead 74 by an output signal from gate 21.

A study of the logical function table associated with gate circuit 22, and illustrated in Figure 2 (*a*) reveals that an output signal is available on conductor 75 only when input signals are present on at least two of leads 72, 73 and 74. It will be seen, therefore, that an output signal is obtained when a 1 is standing both in trigger 42 and in trigger 52, or when a 1 is standing in either of triggers 42 and 52 and an output signal is present from gate 21, or a 1 is standing in both of triggers 42 and 52 and an output signal is present from gate 21. Thus, "and" gates 81, 82 and 83 are responsive to one of the four possible conditions, "and" gate 81 presenting an output when input leads 72 and 73 present signals, gate 82 when input leads 72 and 74 present input signals, gate 83 when leads 73 and 74 present input signals, and all three of "and" gates 81, 82 and 83 are activated when input leads 72, 73 and 74 present input signals. Logical "or" gate 85 serves to receive the outputs of any one, or all three, of gates 81, 82, and 83, present on conductors 102, 104 and 106 respectively, and furnish an output signal on conductor 75 to gate circuits 23 and 33 in the following order.

The operation of such logical diode gate circuits is well known to those skilled in the art, and therefore, will not be discussed herein in detail. Briefly, the quiescent condition zero potential normally present on input leads 72, 73 and 74 is raised to a suitably positive potential, such as 90 volts, by an input signal. The polarity of diodes 86 and 87 are arranged in such a manner that the potential on output leads 102 cannot assume a potential above that of the least positive input lead. Therefore, the potential of output conductor 102 remains at zero potential as long as either one of input leads 72 or 73 does not have a positive potential applied thereto. The input leads are activated by positive polarity signals of 90 volts, exemplarily, and when both of input conductors 72 and 73 are thus activated, the potential of output lead 102 rises to 90 volts. Power to the circuit is furnished by a suitable power supply, not shown, through power bus 96 and load resistor 95.

Logical "and" circuits 82 and 83 are substantially similar to "and" circuits 81. While "and" circuit 81 is responsive to input signals on leads 72 and 73, "and" circuit 82 is responsive to input signals present only on input leads 72 and 74, and logical "and" circuit 83 is responsive only to input signals on leads 73 and 74. When all three of input leads 72, 73 and 74 are activated, all three of "and" circuits 81, 82 and 83 furnish output signals on their respective output leads 102, 104 and 106 to "or" circuit 85.

A positive potential on any one, or all three, input leads 102, 104 and 106, from "and" circuits 81, 82 and 83 respectively, cause a positive output voltage to appear on output leads 75. Since diodes 101, 103 and 105 are arranged to conduct when the anodes facing "and" circuits 81, 82 and 83 are positive, the potential on output conductor 75 is maintained at substantially the potential of any of input conductors 102, 104 or 106 which may be carrying a positive signal potential. An output potential of, exemplarily, 90 volts, will, therefore, be present on conductor 75 if any one of inputs 102, 104 or 106 are activated, or if all three inputs are activated.

It will be apparent, therefore, that a positive potential input signal on any combination of two of input conductors 72, 73 and 74 activates one of "and" circuits 81, 82 or 83, and applies a positive potential output signal on output lead 75 through "or" circuit 85. If all three of input leads 72, 73 and 74 have input potentials applied thereto, all three "and" gates 81, 82 and 83 will be activated, and an output signal will again be produced on output lead 75 through "or" circuit 85. However, an input signal on only one of input leads 72, 73 and 74 will not activate any of "and" circuits 81, 82 and 83, and an output signal will not be present on conductor 75. Thus, it will be seen that the logical function table associated with gate 22, exemplifying gates 22–25, illustrated in Figure 2(*a*), is fulfilled.

Gate 21, illustrated in Figure 2(*b*), may be constructed in a substantially simpler manner than gates 22–25, since only two inputs are to be applied thereto. Inasmuch as gate 21 forms part of the first order, no carry signal from preceding orders is available. Therefore, an input signal is applied to gate 21 only when a 1 is standing in either of triggers 41 and 51. If a 1 is standing in trigger 51, a signal is applied to gate 21 over conductor 111. A 1 standing in trigger 41 applies an input signal to gate 21 through conductor 112. Referring to the logical function table illustrated in Figure 2(*a*), which is also applicable to this gate, although restricted to only two inputs, it will be noted that an output signal is furnished only when input leads from both registers are actuated, inasmuch as a carry input signal from a previous stage is not available to gate circuit 21. Therefore, a simple logical "and" circuit having two inputs, furnishing a single output upon actuation of both of the two input conductors, will satisfy the logical requirements of gate 21.

Diode 113 is connected to input lead 111 through resistor 114, while diode 115 is connected to input lead 112 through 116. Diodes 113 and 115 have a common output lead 74. A positive potential is applied to diodes 113 and 115 through resistor 117 by a suitable power supply (not shown).

Logical "and" gate 21 operates in a manner substantially identical to "and" gates 81–83 disclosed hereinabove. Diodes 113 and 115 are connected in the circuit in such a manner that potential of output lead 74 cannot be higher than the least positive input lead, in the manner disclosed hereinabove in connection with "and" circuit 81. Thus, a positive output potential will appear on output lead 74 only when positive input potentials are simultaneously applied to both of input leads 111 and 112 by triggers 51 and 41.

A second group of gate circuits 31–35, are provided to change the condition of the triggers in the addend and sum register. As disclosed hereinabove, such a change in condition of an addend and sum trigger is determined by reference to digit pairs which may be present in lower order triggers. Thus, gate 32 in the second order is responsive to a signal representing the complement of the digit standing in trigger 42, the output signal from gate 21, and the "add" command pulse. Gate 32 produces an output signal only in response to two distinct conditions. In one case, an output signal is produced when no input signals are provided on conductors 74 and 76, but the "and" command pulse is present on conductor 66. In the second case, an output signal is furnished, thereby changing the condition of trigger 52, when input signals are provided on all three of input conductors 66, 76, and 74.

A schematic diagram of gate 32, typical of gates 32–35, is illustrated in Figure 3. The logical function table associated with gate 32 is illustrated by Figure 3(*a*). Included in gate 32 is a logical "and" circuit 121, containing diodes 122, 123 and 124. Diode 122 is connected to an "inhibit" circuit through resistor 125. Such "inhibit" circuits, as is well known to those skilled in the art, include an electron discharge device 126 having at least a cathode 127, a control electrode 131, and an anode 132. A suitable source of positive voltage, not shown, is furnished to anode 132 through power bus 96 and load resistor 133. Cathode 127 is connected to a negative voltage source (not shown) through negative voltage bus 134. Control electrode 131 is likewise connected to negative voltage bus 134 through resistor 135. Resistor 125 is connected between anode 132 of electron discharge device 126 and diode 122. Input lead 74 is connected to control electrode 131. Electron discharge device 126, in the "inhibit" circuit thus described, is normally non-conducting when input conductor 74 is not activated by a positive signal. Thus, by suitably proportioning resistors 133 and 135, and the potentials, applied to conductors 96 and 134, anode 132 is maintained substantially at the potential of power bus 96, thereby applying a positive potential through resistor 125 to diode 122 of "and" gate 121. Electron discharge device 126 is caused to assume the conductive condition when a positive input signal is present on conductor 74. The negative potential normally present on cathode 127, in connection with the voltage drop across resistor 133, therefore lowers anode 132 to substantially ground potential, thus lowering the input to diode 122 to ground potential.

Diode 123 is connected to input conductor 66 through resistor 136. Diode 124 is connected to input lead 76 through resistor 137 and "inhibit" circuit 141, similar in structure and function to "inhibit" circuit 128, disclosed hereinabove. That is, when a positive input signal is present on conductor 76, resistor 137 of "and" gate 121 is maintained at ground potential. If conductor 76 is at quiescent ground potential, a positive potential is applied to resistor 137 of "and" gate 121. A positive potential is applied to diodes 122, 123 and 124 by a suitable power supply (not shown) through power bus 96 and resistor 142.

It will be apparent, therefore, that a positive output potential on output conductor 143 will be produced only when input conductor 66 is activated by a positive potential, and input conductors 74 and 76 are in the unactivated condition and therefore at ground potential. When conductors 74 and 76 are at ground potential, "inhibit" circuits 128 and 141 provide the positive inputs which, in conjunction with the positive potential on conductor 66, are necessary for "and" gate 121 to provide a positive output signal on output conductor 143. If either of conductors 74 or 76 furnish a positive input signal, "inhibit" circuits 128 and 141 apply ground potentials to "and" gate 12, thereby inhibiting the output signal on conductor 143.

Gate 32 is provided with a second "and" circuit 144, including diodes 145, 146 and 147. Diode 145 is connected to input conductor 74 through resistor 151, diode 146 is connected to input lead 66 through resistor 152, and diode 147 is connected to input conductor 76 through resistor 153. A positive voltage is supplied to diodes 145, 146, and 147 by a suitable power supply (not shown) through conductor 96 and load resistor 154.

Logical "and" circuit 144 serves to supply a positive output signal on conductor 155 only when positive input potentials are present simultaneously on input conductors 74, 66 and 76. The potential of output conductor 155 cannot rise above the potential of the least positive input conductor, as explained hereinabove in connection with "and" circuit 81 of Figure 2.

Output conductor 143 of "and" circuit 121, and output conductor 155 of "and" circuit 144 also serve as input conductors to logical "or" circuit 156. "Or" circuit 156 comprises a diode 157 responsive to potentials on conductor 143 and diode 160 responsive to potentials on conductor 155. A resistor 161 is provided between the output of diodes 157 and 160 and ground. Output potentials from logical "or" circuit 156 are furnished on lead 77.

Operating in a manner similar to "or" circuit 85, disclosed hereinabove in connection with Figure 2, "or" circuit 156 supplies a positive output potential on conductor 77 when either conductor 143 or conductor 155 supplies a positive input potential to "or" circuit 156.

It will be apparent to one skilled in the art, therefore, that an output signal on conductor 77 from gate 32 will be produced, in the first case, if input conductor 66 is carrying a positive potential and input conductors 74 and 76 are unactivated, and therefore at ground potential. Conductor 66 provides a positive potential directly to "and" circuit 121, while "inhibit" circuits 128 and 141, in response to the ground potential of conductors 74 and 76, provide positive potentials to "and" circuit 121, while "inhibit" circuits 128 and 141, in response to the ground potential of conductors 74 and 76, provide positive potentials to "and" circuit 121. Conductor 143 carries the positive output potential to "or" circuit 156, through which it is furnished to output conductor 77. In the second case, all three of input conductors 74, 66 and 76 are activated by positive signal potentials. "Inhibit" circuits 128 and 141 respond to positive input potentials by applying ground potentials to diodes 122 and 124 of "and" gate 121, as disclosed hereinabove, thus inhibiting operation of "and" gate 121. However, the three positive input potentials applied to "and" gate 144 raises the potential on conductor 155 to the voltage level of the three input potentials. The positive potential on conductor 155 is applied to "or" circuit 156, and passed through diode 160 to output conductor 77. Thus, it will be seen that an output signal on conductor 77 from gate 32 is available only when input conductors 74 and 76 are not activated and input conductor 66 is activated, in the first case, and when all three of conductors 74, 66 and 76 are activated, in the second case, thus fulfilling the requirements of the logical function table illustrated by Figure 3(*a*).

It will be noted in Figure 1 that gate 31, of the group of gates 31–35, has only two input conductors. A schematic diagram of gate 31 is represented by Figure 3(*b*). A first input conductor carries the complement of the digit standing in trigger 41, and a second input conductor 66, carries the "add" command pulse. When activated by carrying a positive potential, the output conductor 163 of gate 31 serves to change the state of trigger 51. A study of the logical function table illustrated in Figure 3 indicates that an output signal will be generated only when a positive potential due to the "add" command pulse is present on conductor 66, and input conductor 162, carrying the complement of the digit standing in trigger 41, indicates a 0 by being at ground potential.

In order to fulfill the required logical function of gate 31, an "and" circuit 164 having two inputs, is provided. A first input is furnished by conductor 66 through resistor 165 to diode 166. The second input is furnished to "inhibit" circuit 167. The inverted output signal from "inhibit" circuit 167 is applied to the second diode 171 of "and" circuit 164 through resistor 172. "Inhibit" circuit 167 and "and" circuit 164 are furnished with a positive potential by a suitable power supply (not shown) through power bus 96. In addition, "inhibit" circuit 167 is furnished with a negative voltage by a power supply (not shown) through negative supply bus 134.

As disclosed hereinabove, "inhibit" circuit 167 serves to provide a positive potential to diode 171, through resistor 172, when input conductor 167 is at ground potential, and place the cathode of diode 171 at ground potential when conductor 162 is activated by a positive voltage. Thus, it will be apparent that a positive output potential will be present on conductor 163 only at the time that a positive input potential is provided to conductor 66, and simultaneously, input conductor 162 has no input signal and is therefore at ground potential, thereby satisfying the conditions of the logical function table illustrated in Figure 3(*a*).

Trigger circuits, of the type which are utilized in the subject embodiment of the invention are commonly known in the art. Such trigger circuits have two stable conditions, and provide a distinct output potential for each condition. A typical trigger, exemplarily the second order trigger 42 of the augend register, is shown in Figure 4. The illustrated trigger circuit includes two electron discharge devices, 173 and 174. As is usual in such circuits, only one discharge device at a time may assume the conducting condition. The condition of electron discharge device 173 is arbitrarily taken as indicative of the digit present in this trigger. If electron discharge device 173 is in the conducting condition, a 1 is indicated on conductor 72 by the positive potential present thereupon due to the voltage drop through cathode resistor 175 of the space current through electron discharge device 173. When electron discharge device 174 is in the conducting condition and discharge device 173 is non-conducting, a 0 is indicated on conductor 72 by placing conductor 72 at ground potential, since cathode resistor 175 is not carrying space current. In an analogous manner, the complement of the digit standing in the register is indicated by the potential present on conductor 76. Thus, if the digit standing in the register is a 1, electron discharge device 174 will be in the non-conducting condition, and a 0 will be indicated on complement lead 76 by maintaining lead 76 at ground potential. Upon completion of the addition operation, trigger 42 is reset by forcing discharge device 174 into the conducting condition by applying a positive pulse to the control electrode through reset bus 71, thereby causing discharge device 173 to indicate a 0 by assuming the non-conducting condition. A 1 may be read into the register by applying a positive pulse to the control electrode of discharge device 173 thorugh conductor 176.

The addend and sum register is composed of a group of trigger circuits generally similar to the trigger circuit disclosed hereinabove in connection with Fig. 4. A typical addend and sum trigger is illustrated by Figure 5. Two electron discharge devices, 177 and 181, are provided with the usual cross-coupling network allowing only one discharge device at a time to assume the conducting condition. The digit standing in the register is represented by the condition of discharge device 177. When electron discharge device 177 is in the conductive condition, a 1 is indicated by a positive potential on conductor 73, resulting from the voltage drop in the cathode resistor due to space current. When electron discharge device 177 is in the non-conductive condition, a 0 is represented by ground potential on conductor 73. Register 52 may be cleared by applying a positive pulse to conductor 71, forcing discharge device 181 into the conducting condition, and discharge device 177 into the non-conductive condition, thereby representing a 0. If a 1 is to be inserted into register 52, a positive pulse is applied to conductor 182, thereby forcing discharge device 177 to assume the conducting condition.

Further, in the disclosed embodiment of this invention it is often necessary to change the condition of discharge device 177, regardless of which digit may be standing in the register. Such a change in condition may be accomplished by applying a positive pulse to conductor 77, connected through capacitors to the control electrodes of both discharge devices. The positive pulse has no effect upon that discharge device which is in the conducting condition, since the control electrode thereof is already positive. However, the positive pulse from conductor 77 immediately causes the non-conducting discharge device to start conducting. Therefore, in accordance with the theory of operation of such trigger circuits well known to those skilled in the art, the previously conducting discharge device ceases to conduct, and the previously non-conducting device assumes the conducting condition. It will be apparent, therefore, that a pulse applied to conductor 77 will change the digit standing in the trigger from 0 to 1, or 1 to 0.

Upon completion of the addition operation, the sum digit remains standing in trigger 52. Frequently, it is desirable to read out the sum digit and apply it to another portion of the equipment for further utilization. To read out the desired digit, a positive polarity "read" command pulse is applied to "and" gate 62 through conductor 67. The digit standing in register 52, if a 1, applies a positive polarity potential to diode 182 of gate 62 through conductor 73 and resistor 183. The positive polarity "read" pulse is applied to diode 184 through resistor 185. Power is applied to readout "and" gate 62 by a suitable power source (not shown) through conductor 186 and resistor 187. It will be apparent to one skilled in the art, therefore, that an output pulse signifying a 1 standing in register 52, will be available on output conductor 191 only when conductor 73 is positive, and the "read" command pulse is applied to conductor 67.

Returning now to Figure 1, it will be assumed that 10110 has been read into the first five orders of the addend and sum register illustrated herein, and is standing therein. The first five orders of the binary number read into the first five orders of the augend register illustrated herein, is 11011. As will be obvious to one skilled in the art, such registers may contain as many orders as desired. Referring to Figure 2(*a*), it will be seen that the 0 standing in register 51 and the 1 standing in register 41 do not produce an output signal from gate 21, since two positive input signals are required in this gate to produce an output signal. As disclosed hereinabove, the imaginary ("0," "0") pair to the right of the lowest order cannot provide a third input signal to gate 21. However, it will be noted that gate 22 provides an output positive potential, since a (1, 1) pair is standing in triggers 42 and 52, thereby providing the two input signals required as one of the four possible input conditions for gate 22 to produce an output signal. The output signal from gate 22 is applied both to one of the inputs of gate 23, and to one of the inputs of gate 33. The function of gate 33 will be further discussed hereinbelow. In addition to the input signal to gate 23 from gate 22, an input signal is provided to gate 23 by the 1 standing in trigger 53. Here again, the two input signals applied to gate 23, which is substantially identical to gate 22 illustrated in Figure 2, provide an output signal to gates 24 and 34. Confining attention to gate 24 for the present, it will be apparent that gate 24 has, in addition to the input signal from gate 23, an input signal from the 1 standing in trigger 44. Thus, gate 24 applies a signal potential to gates 25 and 35. Again confining our attention to gate 25, it will be seen that, in addition to the signal from gate 24, gate 25 is furnished with input signals due to a 1 standing in trigger 45, and a 1 standing in trigger 55. Thus, with three input signals gate 25 provides an output to the gates of a sixth order (not shown). It will be seen therefore, that the carry produced by the (1, 1) pair standing in triggers 42 and 52 of the second order is propagated through gates 22–25, etc., as far as the next order having a (0, 0) pair, which occur, in the example illustrated, in the sixth order. Since the operation of gates 21–25 is dependent only upon the static voltages at the outputs of registers 41–45 and 51–55, it will be seen that the pattern of carry voltages is set up simultaneously with the reading in of digits into the registers.

After the various digits have been read into the addend and augend registers, and the pattern of carry voltages are set up simultaneously therewith, the digits in the addend register may then be modified to represent the sum. As disclosed hereinabove, only the digits standing in these addend and sum registers are changed wherein a change is necessary to represent the sum digit in that order. The required changes in the digits standing in the addend and sum register are accomplished by gates 31–35 in response to the complements of the digits standing in the augend register, the carry output signals from gates 21–25 responsive to lower order pairs, and the "add" command pulse from bus 66. Starting with the lowest order, the 1 standing in the augend register in complement form is compared by means of gate 31, with the next lower order pair, which in this case, is the imaginary ("0," "0") pair to the right of the lowest order, as disclosed hereinabove. Gate 31 therefore, determines that the 1 standing an augend trigger 41, and the next lower order ("0," "0") pair are unlike, thus requiring that the 0 addend digit be altered to a 1 to provide the sum.

It will be apparent, therefore, that the complement of the 1 standing in trigger 41 provides a 0 input to gate 31, enabling gate 31 to be activated by the "add" pulse from bus 66. The resultant pulse output on lead 163 will, therefore, change the condition of trigger 51, resulting in the correct sum digit, a 1, standing in trigger 51. The change in the addend digit is accomplished simultaneously in all orders by application of the "add" pulse on bus 66 to all gates 31–35 simultaneously.

Keeping the simultaneous nature of the addition operation in mind, gates 32–35 will be investigated to determine whether the condition of addend and sum triggers 52–55 will be altered by gates 32–35 in response to the "add" pulse. As disclosed hereinabove, gate 21 indicates the nature of the first digit pair of a lower order than the second. It will be seen that, again, the next lower order pair is the imaginary ("0," "0") pair. Thus, gate 21 does not provide an input signal to gate 32. Since a 1 is standing in augend trigger 42, the input signal to gate 32 from the complement again is a 0. In accordance with the logical function table shown in Figure 3, gate 32 will, therefore, change the condition of the 1 digit standing in addend trigger 52 upon application of the "add" command pulse, resulting in a 0 sum digit standing in trigger 52.

Continuing to the third order, it will be noted that the next lower order digit pair is the (1, 1) pair standing in the addend and augend triggers in the second order. The two inputs to gate 22 thus produce an output potential which is applied to one input of gate 33. Inasmuch as a 0 is standing in augend trigger 43, a potential representing a 1 is furnished from the complement side of trigger 43 to the second input of gate 33. It will be apparent, therefore, that an output pulse in response to the "add" pulse will be furnished by gate 33 to change the condition of addend trigger 53, resulting in a 0 sum digit. As disclosed hereinabove, such a change in the addend digit to represent the sum is the result of the difference between the 0 augend digit and the (1, 1) pair in the second order.

The fourth order augend digit is a 1, as are the digits of the (1, 1) pair in the next lower order, said pair being in the second order in this case. Thus, the sum digit is the same as the addend digit. An output potential from gate 23 is present at one input of gate 34, propagated by the (1, 1) pair in the second order. However the complement of the digit standing in trigger 44 is a 0. Recalling the characteristics of gate 34, it will be noted that the combination of an 0 input from trigger 44 and the presence of a carry potential from gate 23 results in inhibiting any output from this gate when the "add" pulse is applied. Thus, the 0 addend digit in trigger 54 remains as 0 sum digit in this order.

The 1 augend digit in the fifth order is compared with the next lower order pair, which is the (1, 1) pair in the second order. Thus, again, the sum digit is the same as the addend digit. As a result of said (1, 1) pair, an output potential is propagated by gates 22, 23 and 24 to provide an input to gate 35. However, the complement of the 1 augend digit is a 0. Therefore, the requirements set forth hereinabove, for an output signal from gate 35 to change the state of trigger 55 are not met, and the 1 standing in augend trigger 55 will remain upon application of the "add" pulse to gate 35.

The sum digits in higher orders of the example presented hereinabove, are determined in a similar manner by potentials present on the two gates in each order. Thus, in the sixth order, the 0 digit in addend register is changed to a 1 to provide the correct sum digit, in the seventh order the addend digit remains the same, and in the eighth order, the 1 addend digit is changed to a 0 to correctly represent the sum. The ninth order sum digit, determined by reference to the eighth order pair, is the same as the addend digit, a 0. The sum digit in the tenth order is a 0, since the eighth order (1, 1) pair and 0 augend digit are opposite, the tenth order sum digit is a 1, and the highest order sum digit is a 1.

After transfer of the sum into the addend and sum register by the "add" pulse, it is frequently desirable to read out the sum into additional apparatus, such as a magnetic drum or other digit storage device. A group of readout gates, 61–65, illustrated in Figures 1 and 5, are provided to allow the binary number standing in the augend and sum register to be read out of the adder into other apparatus, such as a magnetic drum. As disclosed hereinabove, a 1 standing in an augend and sum trigger applies a positive potential to one input of the readout "and" gate. At the time it is desired to read out the sum, a positive pulse is applied to all readout "and" gates simultaneously, by means of bus 67. A positive polarity output pulse will be simultaneously presented at the output terminals of those gates associated with sum triggers containing a 1, while no output will be presented at those gates associated with sum triggers containing a 0. Accordingly, gate 61 will have a positive pulse output representing a 1, gates 62, 63 and 64 will not have outputs, thereby representing 0 sum digits, and gate 65 will have a pulse output representing a 1. Further orders (not shown) are similarly read out simultaneously.

It will be seen, therefore, that the digits to be added are read into the augend and addend registers in any suitable manner. A pattern of static potentials are thereby concurrently set up on the two gates in each order by the digits standing in the registers. An "add" pulse is applied to all orders simultaneously by means of bus 66. The "add" pulse serves to change the state of such addend triggers as may be required to indicate the sum digits in the same triggers. A "readout" pulse simultaneously applied to readout "and" gates 61–65 serves to apply pulses to the output conductor associated with each order representing the sum digits standing in triggers 51–55 after application of the "add" pulse. The output sum-representing potentials may be applied to any desired utilization apparatus, such as sum indicating means, storage means or further computation apparatus, as will appear obvious to one skilled in the art. A "reset" pulse may then be applied to the addend and augend registers by means of bus 71, clearing the registers in preparation for further addition operations.

Frequently, it is desirable to successively add and accumulate binary digits representing a continuous applied variable, such as electrical voltage, current, linear and rotational movement, quantities of material flow, etc. Such continuous data may be represented by the angular position of a rotatable shaft. As is well known to those skilled in the art, the instantaneous angular position of a rotatable shaft may be translated into a parallel pattern of voltage conditions representing binary digits by means of a binary coded disc fixedly attached to the shaft and rotatable therewith.

The embodiment of this invention illustrated by Figure 6 exemplifies the use of such a binary coded disc to replace the augend register trigger circuits of Figure 1. In this embodiment, binary digits representing a physical phenomenon may be added to a binary number in the addend and sum register under the control of an add command pulse. As will be apparent, both the binary number standing in the addend register and the add command pulse may similarly be representative of a physical phenomenon. Thus, the addend and sum register may be caused to accumulate digits representative of the position of the binary coded disc at intervals determined by the add command pulse, whereby the binary number read out of the addend and sum register may represent the total numbers presented by disc, or may represent an approximate integral of the information presented by the disc with respect to information presented by the add pulses.

Referring to Figure 6, a binary coded commutator disc 192 is mounted on a rotatable shaft 193. The angular position of shaft 193 may be caused to represent the quantitative value of an applied variable. Commercially available equipment, such as servo systems, self-balancing bridges, and recording potentiometers, may be employed, in known manner, to translate temperatures, quantities of materials, electrical voltages and currents and other variables translatable thereto, into angular shaft positions representing given quantitative values of the desired variable. Commutator disc 192, fastened to, and rotating with, shaft 193, is fabricated of a suitable insulating material. Conducting portions 194 are suitably fixed to disc 192. Cooperating with the conducting portions 194 are commutator brushes 241, 242, 243, 244 and 245. Each one of commutator brushes 241 to 245 cooperates with one of conducting portions 194 of disc 192. A positive potential is applied to conducting portion 194 by means of commutator brush 195 connected to a suitable voltage source, such as battery 196. Conducting portion 194 is formed in a manner well known to those skilled in the art as to selectively apply a potential from battery 196 to commutator brushes 241–245, thereby representing the angular position of disc 192 by a pattern of voltage conditions on brushes 241–245 indicating a multi-order binary number. It will be apparent, therefore, that binary coded commutator disc 192 and commutator brushes 241–245 furnish a multi-order augend number in parallel to the gate circuits of this invention, analogous in function to, and replacing, trigger circuits 41–45 of the embodiment illustrated in Figure 1. Such binary coded commutator discs are old and well-known to the art. A representative disc of this type is commercially available from M. Giannini and Co., Inc., Pasadena, California, and is described in their bulletin No. 109. Other types of coded discs are contemplated by this invention, such as magnetic form as disclosed in U.S. Patent No. 2,597,866, issued to D. H. Gridley, May 27, 1952, or similar to the photo-electric disc and reader disclosed in U.S. Patent No. 2,679,644, issued to B. Lippel, et al., May 25, 1954.

The ordinal binary digit represented by the presence or absence of a voltage applied to each of commutator brushes 241–245, by battery 196, slip ring 195, and binary coded conductive portions 194 of disc 192, are applied respectively, to gate circuits 231–235, similar in function and structure to gates 31–35, disclosed hereinabove. However, it will be recalled that signals applied to gates 31–35 by trigger circuits 41–45 represent the complement of binary digits standing in trigger circuits 41–45. On the other hand, the binary digit itself is furnished to gates 231–235 by commutator brushes 241–245. Therefore, gates 31–35, as illustrated by Figure 3 and Figure 3*a*, are modified in a manner obvious to one skilled in the art. Gate 31 may be modified to form gate 231 merely by removing "inhibit" circuit 167, resulting in an elementary two-input "and" circuit. Gates 32, 33, 34 and 35 are modified to form gates 232, 233, 234 and 235 by removing "inhibit" circuit 141, associated with conductor 76, resistor 137, and diode 124 of "and" gate 121, thereby connecting resistor 137 directly to conductor 176. An identical "inhibit" circuit is placed in series relation between conductor 76 and resistor 153, which form part of "and" gate 144. In this manner, a signal representing the binary number, rather than one representing the complement, may be employed to actuate the adding circuit constructed in accordance with this invention.

It will be apparent, therefore, that the angular position of disc 192, representative of the measured variable, supplies binary augend digits in parallel to gate circuits 231–235. Commutator brush 241, replacing trigger circuit 41 in the augend register of Figure 1, applies the first order augend digit to gates 231 and 21 by means of conductor 112. Commutator brush 242, replacing trigger circuit 42 applies the second order augend digit to gates 232 and 22 by means of conductor 72. Similarly, commutator brushes 243, 244 and 245, replacing augend register trigger circuits 43, 44 and 45, apply the third, fourth and fifth order augend digits to gates 233 and 23, 234 and 24, and gates 235 and 25, respectively. Thus, an add pulse applied by conductor 66 to gates 231–235 will simultaneously add the multi-order augend number manifested as a pattern of voltage conditions on brushes 241–245 to the multi-order addend number standing in addend register triggers 51–55.

Conductive portions 194 of augend register disc 192 have associated therewith commutator brushes 241–245. A positive potential is applied to conductive portions 194 over slip ring 195 by means of battery 196. Commutator brush 241 applies a first order augend digit to gates 231 and 21 by means of conductor 112. Commutator brush 242 applies the second order augend digit over conductor 72 to gates 232 and 22. In a like manner, brush 243 supplies the third order augend digit to gates 233 and 23, brush 23, brush 244 supplies the fourth order digit to gates 234 and 24, and brush 245 supplies the fifth order augend digit to gates 235 and 25. A binary 1 is represented when a positive potential is applied to these gates, and a binary 0 is represented by zero voltages at these gates, analogous to the voltages presented by triggers 41–45.

Addend digits may be furnished to triggers 51–55 in the manner disclosed hereinabove in connection with Figure 1, or the digits initially present in the addend register may be 0's, if it is desired to accumulate numbers representative of angular shaft position at specific times.

In order to add the multi-order number represented by potentials present on brushes 241–245 due to the angular position of disc 192 to a multi-order number present in the addend register trigger circuits, a procedure similar to that disclosed in connection with Figure 1 is employed. An add pulse is simultaneously applied to gates 231–235 by means of bus 66. The multi-order number representing the applied variable by the angular position of disc 192 and shaft 193, and the voltage pattern associated therewith, is simultaneously added into the addend register, carries being accounted for coincidentally in the manner disclosed hereinabove in connection with Figure 1. The resultant sum standing in triggers 51–55 may then be read out upon application of a pulse to bus 67, as disclosed hereinbefore in connection with Figure 1.

It will also be apparent that a sequence of numbers representing a series of successive angular positions of shaft 193 may be accumulated in the addend and sum register. The addend and sum register is initially clear. At a desired instant, the add pulse transfers the multi-order binary number representing the angular position of disc 192 by a pattern of voltages on brushes 241–245 into the addend and sum register. A successive add pulse adds the digital representation of shaft position at the time of said successive add pulse to the number in the addend and sum register representing the previous shaft position, the sum thus becoming a new addend. Accumulation of data in this manner may continue until the addend and sum register is full. The sum standing in the addend and sum register may be read out at any time. As will be apparent to one skilled in the art, such a digit accumulator may be considered to be an approximate integrator, integrating augend digits with respect to the add pulses. The add pulses may be furnished at regular time intervals, thereby integrating the variable represented by shaft position with respect to time, or the number of add pulses furnished may represent an independent variable thus integrating the variable represented by the position of shaft 193 with respect to an independent variable.

It is well known to those skilled in the art that binary adding circuits such as disclosed hereinabove are frequently utilized as the basic computing unit of large multi-purpose digital computers. Binary adding circuits may be used for subtraction merely by inserting the ones complement of the subtrahend into the augend register, and the minuend into the addend register. Multiplication may be accomplished by repeated addition, and division by repeated subtraction. Integration may be accomplished in the manner disclosed hereinabove. More complex computations, such as differentiation or extraction of roots, may be accomplished by various combinations of the above basic operations, as is well known to those skilled in the art.

It will be apparent, therefore, that hereinabove has been disclosed a novel binary adding device having greater speed of computation, greater accuracy, and fewer parts than such devices heretofore, known to the art.

While only representative embodiments of apparatus for practicing the invention disclosed herein have been outlined in detail, there will be obvious to those skilled in the art many modifications and variations of the disclosed embodiment. For example, transistors may be employed in place of the electron discharge devices disclosed, or the crystal diodes disclosed may be replaced by other suitable non-linear devices, such as the thermionic diodes. It will be clearly understood, therefore, that the hereinabove disclosed embodiments are intended only by way of example. The scope of this invention is to be limited only by the scope of the appended claims.

What we claim is:

1. In electrical computing apparatus, a first multiorder register including a trigger circuit in the *n* order containin the *n* order addend digit, a second multiorder register including a trigger circuit in the *n* order containing the *n* order augend digit, means provided in the *n* order for determining the *n* order sum digit and for replacing the *n* order addend digit with the *n* order sum digit, said means including a first gate circuit responsive to lower order digit pairs, said first gate circuit comprising a first "and" circuit responsive to a 1 in said *n* order trigger circuit of said first register and to a 1 in said *n* order trigger circuit of said second register, a second "and" circuit responsive to a 1 in said *n* order trigger circuit of said second register and to a signal representing a (1, 1) digit pair from a lower order, a third "and" circuit responsive to a 1 in said *n* order trigger circuit of said first register and to a signal representing a (1, 1) digit pair from a lower order, and an "or" circuit responsive to said first, second and third "and" circuits furnishing an output signal to the $n+1$ order representing a (1, 1) digit pair from a lower order, said means further including a second gate circuit comparing said lower order digit pair with said *n* order augend digit and selectively furnishing an output pulse to said *n* order trigger circuit in said first register, whereby the digit present in said *n* order trigger circuit of said first register may be caused to represent the *n* order sum digit.

2. In electrical computing apparatus, a first multiorder register including a trigger circuit in the *n* order containing the *n* order addend digit, a second multiorder register including a trigger circuit in the *n* order containing the *n* order augend digit, means provided in the *n* order for determining the *n* order sum digit and replacing the *n* order addend digit with the *n* order sum digit, said means including a first gate circuit having a first, a second, and a third "and" circuit and an "or" circuit responsive to pairs of like digits in said first and second registers, a second gate circuit comparing a pair of like digits in lower order with said *n* order augend digit, said second gate circuit including a fourth "and" circuit responsive to an "add" pulse, a 1 in said second *n* order trigger circuit, and a signal representing a (0, 0) digit pair from a lower order, a fifth "and" circuit responsive to said "add" pulse, a 0 in said second *n* order trigger circuit, and a signal representing a (1, 1) digit pair from a lower order, and an "or" circuit responsive to said fourth and fifth "and" circuits furnishing an output pulse to change the state of said first trigger circuit in the *n* order, whereby the *n* order addend digit is changed to represent the *n* order sum digit if said *n* order augend digit differs from the lower order digit pair, and the *n* order addend digit remains as the *n* order sum digit if the *n* order augend digit is the same as said lower order digit pair.

3. In electrical computing apparatus, a first multiorder register including a trigger circuit in the *n* order containing the *n* order addend digit, a second multiorder register including a trigger circuit in the *n* order containing the *n* order augend digit, means for determining the *n* order sum digit and for replacing the *n* order addend digit with the *n* order sum digit by comparing the *n* order augend digit with the first digit pair of lower order, said means comprising a first gate circuit responsive to lower order digit pairs, including a first "and" circuit responsive to a 1 in said first *n* order trigger circuit and to a 1 in said second *n* order trigger circuit, a second "and" circuit responsive to a 1 in said second *n* order trigger circuit and to a signal representing a (1, 1) digit pair from a lower order, a third "and" circuit responsive to a 1 in said first *n* order trigger circuit and to a signal representing a (1, 1) digit pair from a lower order, and an "or" circuit responsive to said first, secand and third "and" circuits furnishing an output signal to the $n+1$ order representing a (1, 1) digit pair in the $n$, $n-1$, $n-2$, . . . $n-n$ order, said means including a second gate circuit comparing said lower order digit pair with said *n* order augend digit, said second gate circuit including a fourth "and" circuit responsive to an "add" pulse, a 1 in said second *n* order trigger circuit, and a signal representing a (0, 0) digit pair from the $n-1$ order, a fifth "and" circuit responsive to said "add" pulse, a 0 in said second *n* order trigger circuit, and a signal representing a (1, 1) digit pair from the $n-1$ order, and a second "or" circuit responsive to said fourth and fifth "and" circuits in said second gate furnishing an output pulse to change the state of said first *n* order trigger circuit, whereby the *n* order addend digit is changed to represent the *n* order sum digit if said *n* order aguend digit differs from the lower order digit pair, and the *n* order addend digit remains as the *n* order sum digit if the *n* order augend digit is the same as the lower order digit pair.

4. In electrical computing apparatus, a multiorder register including a trigger circuit in the *n* order containing the *n* order addend digit, position indicating means comprising means for producing an ordinal pattern of voltage conditions on a plurality of conductors including a voltage condition on the *n* order conductor representing the *n* order augend digit, means provided in the *n* order for determining the *n* order sum digit and replacing the *n* order addend digit with the *n* order sum digit, said means including a first gate circuit having a first, second, and third "and" circuit and an "or" circuit responsive to pairs of like digits in said first register and said position indicating means, a second gate circuit comparing a pair of like digits in lower order with said *n* order augend digit, said second gate circuit including a fourth "and" circuit responsive to an "add" pulse, a 1 on said *n* order conductor, and a signal representing a (0, 0) digit pair from a lower order, a fifth "and" circuit responsive to said "add" pulse, a 0 on said *n* order conductor, and a signal representing a (1, 1) digit pair from a lower order, and an "or" circuit responsive to said fourth and fifth "and" circuits furnishing an output pulse to change the state of said trigger circuit in the *n* order, whereby the *n* order addend digit is changed to represent the *n* order sum digit if said *n* order augend digit differs from the lower order digit pair, and the *n* order addend digit remains as the *n* order sum digit if the *n* order augend digit is the same as said lower order digit pair.

5. In electrical computing apparatus, a multiorder register including a trigger circuit in the *n* order containing the *n* order addend digit, position indicating means comprising means for producing an ordinal pattern of voltage conditions on a plurality of conductors including a voltage condition on the *n* order conductor representing the *n* order augend digit, means provided in the *n* order for determining the *n* order sum digit and for replacing the *n* order addend digit with the *n* order sum digit, said means including a first gate circuit responsive to lower order digit pairs, said first gate circuit comprising a first "and" circuit responsive to a 1 in said *n* order trigger circuit of said register and to a 1 on said *n* order conductor of said position indicating means, a second "and" circuit responsive to a 1 on said *n* order conductor of said position indicating means and to a signal representing a (1, 1) digit pair from a lower order, a third "and" circuit responsive to a 1 on said *n* order conductor of said position indicating means and to a signal representing a (1, 1) digit pair from a lower order, and an "or" circuit responsive to said first, second and third "and" circuits furnishing an output signal to the $n+1$ order representing a (1, 1) digit pair in the $n$, $n-1$, $n-2$ . . . $n-n$ order, said means further including a second gate circuit comparing said lower order digit pair with said *n* order augend digit and selectively furnishing an output pulse to said *n* order trigger circuit in said register, whereby the digit present in said *n* order trigger circuit of said register may be caused to represent the *n* order sum digit.

6. In electrical computing apparatus, a multiorder register including a trigger circuit in the *n* order containing the *n* order addend digit, means responsive to an applied variable for producing an ordinal pattern of voltage conditions digitally representing the magnitude of said variable including a voltage condition on an *n* order conductor representing the *n* order augend digit, means provided in the *n* order for determining the *n* order sum digit and for replacing the *n* order addend digit with the *n* order sum digit, said means including a first gate circuit responsive to lower order digit pairs, said first gate circuit comprising a first "and" circuit responsive to a 1 in said *n* order trigger circuit and to a 1 on said *n* order conductor, a second "and" circuit responsive to a 1 on said *n* order conductor and to a signal representing a (1, 1) digit pair from a lower order, a third "and" circuit responsive to a 1 on said *n* order trigger circuit and to a signal representing a (1, 1) digit pair from a lower order, and an "or" circuit responsive to said first, second and third "and" circuits furnishing an output signal to the $n+1$ order representing a (1, 1) digit pair from a lower order, said means further including a second gate circuit comparing a signal representing said lower order digit pair with a voltage condition representing said *n* order augend digit and selectively furnishing an output pulse to said *n* order trigger circuit, whereby the digit present in said *n* order trigger circuit may be caused to represent the *n* order sum digit.

References Cited in the file of this patent

UNITED STATES PATENTS

| | | |
|---|---|---|
| 2,609,143 | Stibitz | Sept. 2, 1952 |
| 2,674,727 | Spielberg | Apr. 6, 1954 |
| 2,705,108 | Stone | Mar. 29, 1955 |
| 2,719,670 | Jacobs et al. | Oct. 4, 1955 |
| 2,803,401 | Nelson | Aug. 20, 1957 |
| 2,808,204 | Geyer et al. | Oct. 1, 1957 |
| 2,845,222 | Genna et al. | July 29, 1958 |

OTHER REFERENCES

Booth: An Electronic Digital Computer, Electronic Engineering, December 1950, pages 496 to 498.

Ross: The Arithmetic Element of the I.B.M. Type 701 Computer, Proc. of the I.R.E., October 1953, pages 1290 to 1292.